United States Patent Office 2,760,900
Patented Aug. 28, 1956

2,760,900

STABILIZED CHLORINATED PESTICIDAL COMPOSITIONS

Harry D. Glenn and Robert J. Dowling, Naugatuck, Conn., assignors to United States Rubber Company, New York, N. Y., a corporation of New Jersey No Drawing. Application November 12, 1952, Serial No. 320,152

16 Claims. (Cl. 167—42)

This invention relates to pesticidal compositions containing a mineral silicate and an active pesticide comprising a chemical having chlorine substitution in an aliphatic group.

Powdered solid carriers, such as mineral silicates, are commonly used in formulating agricultural chemicals, such as insecticides and fungicides. The amount of active ingredient may be from 1 to 150 parts per 100 parts of the mineral silicate, the lower concentrations being formulated as finished dusts for direct use; the higher concentrations being formulated either as so-called wettable powders which contain surface-active wetting agents or as dust concentrates for further dilution with mineral silicates for ultimate use. It has been found that when mineral silicates have been used as the powdered solid carriers for such insecticides and fungicides having chlorine substitution in an aliphatic group (the term "aliphatic" including cyclo aliphatic), the mineral silicate carrier acts in various ways to reduce the biological effectiveness of the pesticide. When the active ingredient is mixed with the mineral silicate carrier, there is a large amount of heat evolved indicating the association of the chemical in the form of a thin film with the finely divided carrier particles. The heat evolved tends to decompose the chemical, and the mineral silicate itself appears to have a catalytic action on the decomposition of the chemical, especially on standing for extended periods at normal temperatures.

According to the present invention, we incorporate in the mineral silicate formulation of the aliphatic-substituted chlorine-containing insecticide or fungicide, a material which poisons the catalytic decomposition action of the mineral silicate on the active ingredient of the formulation.

In carrying out the present invention there is incorporated in the pesticidal composition containing the powdered mineral silicate carrier and the insecticide or fungicide, the modified carbohydrate constituents from the waste sulfite liquor in wood pulp manufacture. These carbohydrate substances are formed by the hydrolysis of the hemicelluloses in the original wood. Such modified carbohydrate constituents are present in the effluent from the fractional precipitation treatment of the waste sulfite liquors with caustic lime reagent by the so-called Howard process. The Howard process is discussed in the article "Waste problems in the pulp and paper industry" by Hervey J. Skinner, in Industrial & Engineering Chemistry, vol. 31, pages 1331–1335. Details of the process are also described by Guy C. Howard, in Industrial & Engineering Chemistry, 22, 1184–1185, and Industrial & Engineering Chemistry, 26, 614–617. As shown in these publications, the precipitate from the first calcium oxide treatment is largely calcium sulfite and the precipitate from the further calcium oxide treatment contains the major proportion of the lignin constituent of the sulfite liquor in the form of the basic calcium salt of lignosulfonic acid. The effluent from this fractional precipitation treatment is alkaline instead of acid, as is the original waste sulfite liquor. The effluent is largely modified carbohydrate constituents formed by the hydrolysis of the hemicelluloses in the original wood and may contain minor amounts of lignin. In practice the alkaline effluent containing the modified carbohydrate constituents of the waste sulfite liquor in the form of the calcium salts is concentrated to 40 to 60% concentration. The calcium in the modified carbohydrate substances may be replaced, in whole or in part, by sodium or other alkali-metal. An aqueous solution of such 40% to 60% concentration of the modified carbohydrate constituents in the form of the sodium or calcium or mixed sodium-calcium salts may be mixed into the powdered mineral silicate, generally before addition of the active insecticide or fungicide. The addition of the modified carbohydrate constituents in the form of an aqueous solution gives the best coverage of the clay particles. After compounding, the bulk of the water will generally evaporate in storage. If desired, more dilute or more concentrated solutions of the modified carbohydrate constituents may be used or the carbohydrate constituents may be admixed in the dry state with the mineral silicate carrier. The amount added of such salts of the modified carbohydrate constituents, on a dry weight basis, may be from 0.5 to 15 parts per 100 parts of the mineral silicate carrier. The preferred method of formulating the pesticidal compositions according to the present invention is to add the aqueous solution of the modified carbohydrate constituents of the waste sulfite liquor to the clay or other mineral silicate carrier in a mixing device such as a Gardner ribbon type mixer or blender, and then to add the pesticide to the mixture. The blending of the materials is continued for sufficient time to assure proper mixing.

The powdered mineral silicate carrier may be mica, pumice, diatomite, talc, pyrophyllite, or a clay, such as the montmorillonite group, a. g., montmorillonite saponite, nontronite, Beidellite, bentonite, Wilkinite; or of the kaolinite group, e. g., kaolinite, Nacrite, Dickite, Anauxite; or of the Attapulgite group, e. g., Attapulgite, Sepiolite. The addition of the modified carbohydrate constituents from the spent sulfite cooking liquor prevents the clay or other mineral silicate carrier from reducing or destroying the biological effectiveness of the insecticide or fungicide, reduces the exothermic reaction on mixing the powdered carrier with the active ingredient, and increases the storage life of the mineral silicate and insecticide or fungicide formulation. In short, we provide a method of poisoning the catalytic decomposition action of the mineral silicate on the active insecticide or fungicide by incorporating the modified carbohydrate constituents in the mineral silicate-pesticide formulation.

Examples of pesticides which are organic compounds having chlorine substitution in an aliphatic group that may be formulated with mineral silicates and the modified carbohydrate constituents from spent sulfite cooking liquor without the mineral silicates reducing or destroying the biological effectivenes of the insecticide or fungicide are: chloralkyl alkyl sulfites, such as shown in U. S. Patent 2,529,493; chloroalkyl aryloxyalkyl sulfites, such as shown in U. S. Patent 2,529,494, e. g. 2-(p-tert-butylphenoxy) isopropyl 2-chlorethyl sulfite (Aramite); 1,2,3,4,10,10 - hexachloro - 1,4,4a5,8,8a - hexahydro-1,4,5,8-dimethanonaphthalene (Aldrin); 1,2,3,4,5,6-hexachlorocyclohexane, various isomers (BHC); 1,2,3,4,5,6-hexachlorocyclohexane, gamma isomer (Lindane); 1,2,-4,5,6,7,8,8 - octachloro - 2,3,3a,4,7,7a - hexahydro - 4,7-methaneindene (Chlordane); 1,2,3,4,10,10-hexachloro-6,7 - epoxy 1,4,4a,5,6,7,8,8a - oxtahydro - 1,4,5,8 - dimethanonaphthalene (Dieldrin); 1,1,1-trichloro-2,2-bis(p-chlorophenyl)ethane (DDT); mixture of 1,2-dichloropropane and 1,3-dichloropropene (D-D mixture); 1(or 3a),4,5,6,7,8,8 - heptachloro - 3a,4,7,7a - tetrahydro- 4,7 - methanoindene (Heptachlor); 1,1,1 - trichloro - 2,2-bis(p - methoxyphenyl)ethane (Methoxychlor); 1,1 - dichloro-2,2-bis(p-ethylphenyl)ethane (Q-137); chlorinated camphene having a chlorine content of 67–69% (Toxaphene); N - trichloromethylthio tetrahydrophthalimide (Orthocide). The effectiveness of the modified carbohydrate compounds from spent sulfite cooking liquor in poisoning the catalytic action of mineral silicates when used as powdered solid carriers in pesticide formulations with the above types of active pesticides is shown in the following examples. All parts and percentages referred to herein are by weight.

In the evaluation procedure in the following runs the formulation to be tested is placed in a porous cardboard container at 60° C. for 20 hours. This treatment equalizes the moisture contents of the various samples and reduces the moisture content to about 2% to 3%. The formulations to be tested are then repackaged in a closed non-porous glass container and heated at 60° C. until incipient decomposition, as shown by evolution of decomposition products. The time of heating until such incipient decomposition takes place is measured. Results of tests on various mineral silicate-pesticide formulations, including the modified carbohydrate constituents of the present invention, and control mineral silicate-pesticide formulations without the modified carbohydrate constituents, are shown in the table below.

contain the salts of the modified carbohydrate constituents formed by the hydrolysis of the hemicelluloses in the original wood in the form of salts selected from the group consisting of sodium and calcium and mixed sodium-calcium salts, and, as an active ingredient, a pesticide which is an organic compound having chlorine substitution in an aliphatic group.

2. A pesticidal composition comprising a clay, the solids of the alkaline effluent from the fractional precipitation treatment of waste sulfite liquor in wood pulp manufacture with caustic lime which contain the salts of the modified carbohydrate constituents formed by the hydrolysis of the hemicelluloses in the original wood in the form of salts selected from the group consisting of sodium and calcium and mixed sodium-calcium salts, said salts being in amount from 0.5 to 15 parts per 100 parts of the clay, and, as an active ingredient in amount from 1 to 150 parts per 100 parts of the mineral silicate, a pesticide which is an organic compound having chlorine substitution in an aliphatic group.

3. A pesticidal composition comprising a powdered mineral silicate, the solids of the alkaline effluent from the fractional precipitation treatment of waste sulfite liquor in wood pulp manufacture with caustic lime which contain the salts of the modified carbohydrate constituents formed by the hydrolysis of the hemicelluloses in the original wood in the form of salts selected from the

| Pesticide (Parts) | Mineral Silicate Carrier (Parts) | Modified Carbohydrate Constituents, Sodium Salt | Time to Incipient Decomposition |
|---|---|---|---|
| Series 1: | | | |
| 17 Aramite | 83 Attapulgite | None (control) | 5 to 8 hours. |
| 17 Aramite | 74.5 Attapulgite | 5 parts | 12 to 14 days. |
| Series 2: | | | |
| 32 Aramite | 68 Attapulgite | None (control) | 5 hours. |
| 32 Aramite | 66.3 Attapulgite | 1 part | 21 hours. |
| 32 Aramite | 64.5 Attapulgite | 2 parts | 42 hours. |
| 27 Aramite | 64.5 Attapulgite | 5 parts | 9 to 13 days. |
| Series 3: | | | |
| 27 Aramite | 73 Diatomite | None (control) | Less than 20 hours. |
| 27 Aramite | 64.5 Diatomite | 5 parts | Greater than 7 days. |
| Series 4: | | | |
| 16.5 Aramite | 62.5 Kaolin<br>20 Attapulgite<br>1 Wetting Agent | None (Control) | Less than 2 days. |
| 16.5 Aramite | 54 Kaolin<br>20 Attapulgite<br>1 Wetting Agent | 5 parts | 8 to 10 days. |
| Series 5: | | | |
| 16.5 Aramite | 62.5 Pyrophyllite<br>20 Attapulgite<br>1 Wetting Agent | None (Control) | Less than 1 day. |
| 16.5 Aramite | 54 Pyrophyllite<br>20 Attapulgite<br>1 Wetting Agent | 5 parts | Better than 2 weeks. |
| Series 6: | | | |
| 5.5 Aramite | 94.5 Pyrophyllite | None (Control) | Less than 1 hour. |
| 5.5 Aramite | 91 Pyrophyllite | 2 parts | Greater than 1 week. |
| Series 7: | | | |
| 20 Dieldrin | 80 Attapulgite | None (Control) | Less than 2 days. |
| 20 Dieldrin | 70 Attapulgite | 5 parts | Greater than 4 days. |
| Series 8: | | | |
| 2.25 Aramite<br>2.50 Orthocide<br>1 Lindane | 76 Mica<br>18 Attapulgite | None (Control) | Less than 1 day. |
| 2.25 Aramite<br>2.5 Orthocide<br>1 Lindane | 67.5 Mica<br>18 Attapulgite | 6 parts | 6 to 10 days. |
| Series 9: | | | |
| 4 DDT<br>2.6 Aramite<br>16 Toxaphene | 33.4 Pumice<br>24 Attapulgite | None (Control) | Less than 1 day. |
| 4 DDT<br>2.6 Aramite<br>16 Toxaphene | 26.5 Pumice<br>24 Attapulgite | 4 parts | 6 days. |

It may be seen from the above accelerated storage tests that the modified carbohydrate constituents from spent sulfite cooking liquor effectively reduce the catalytic decomposition activity of various mineral silicate carriers on various pesticides having chlorine substitution in an aliphatic group.

Having thus described our invention, what we claim and desire to protect by Letters Patent is:

1. A pesticidal composition comprising a powdered mineral silicate, the solids of the alkaline effluent from the fractional precipitation treatment of waste sulfite liquor in wood pulp manufacture with caustic lime which group consisting of sodium and calcium and mixed sodium-calcium salts, and, as an active ingredient a chloroalkyl sulfite.

4. A pesticidal composition comprising a clay, the solids of the alkaline effluent from the fractional precipitation treatment of waste sulfite liquor in wood pulp manufacture with caustic lime which contain the salts of the modified carbohydrate constituents formed by the hydrolysis of the hemicelluloses in the original wood in the form of salts selected from the group consisting of sodium and calcium and mixed sodium-calcium salts, said salts being in amount from 0.5 to 15 parts per 100 part of the clay, and, as an active ingredient, a chloroalkyl sulfite in amount from 1 to 150 parts per 100 parts of mineral silicate.

5. A pesticidal composition comprising a powdered mineral silicate, the solids of the alkaline effluent from the fractional precipitation treatment of waste sulfite liquor in wood pulp manufacture with caustic lime which contain the salts of the modified carbohydrate constituents formed by the hydrolysis of the hemicelluloses in the original wood in the form of salts selected from the group consisting of sodium and calcium and mixed sodium-calcium salts, and, as an active ingredient, a chloroalkyl aryloxyalkyl sulfite.

6. A pesticidal composition comprising a clay, the solids of the alkaline effluent from the fractional precipitation treatment of waste sulfite liquor in wood pulp manufacture with caustic lime which contain the salts of the modified carbohydrate constituents formed by the hydrolysis of the hemicelluloses in the original wood in the form of salts selected from the group consisting of sodium and calcium and mixed sodium-calcium salts, said salts being in amount from 0.5 to 15 parts per 100 parts of the clay, and, as an active ingredient, a chloroalkyl aryloxyalkyl sulfite in amount from 1 to 150 parts per 100 parts of mineral silicate.

7. A pesticidal composition comprising a powdered mineral silicate, the solids of the alkaline effluent from the fractional precipitation treatment of waste sulfite liquor in wood pulp manufacture with caustic lime which contain the salts of the modified carbohydrate constituents formed by the hydrolysis of the hemicelluloses in the original wood in the form of salts selected from the group consisting of sodium and calcium and mixed sodium-calcium salts, and 2-(p-tert-butylphenoxy) iso-isopropyl 2-chloroethyl sulfite.

8. A pesticidal composition comprising a clay, the solids of the alkaline effluent from the fractional precipitation treatment of waste sulfite liquor in wood pulp manufacture with caustic lime which contain the salts of the modified carbohydrate constituents formed by the hydrolysis of the hemicelluloses in the original wood in the form of salts selected from the group consisting of sodium and calcium and mixed sodium-calcium salts, said salts being in amount from 0.5 to 15 parts per 100 parts of the clay, and 2-(p-tert-butylphenoxy) isopropyl 2-chloroethyl sulfite in amount from 1 to 150 parts per 100 parts of mineral silicate.

9. A pesticidal composition comprising a powdered mineral silicate, the solids of the alkaline effluent from the fractional precipitation treatment of waste sulfite liquor in wood pulp manufacture with caustic lime which contain the salts of the modified carbohydrate constituents formed by the hydrolysis of the hemicelluloses in the original wood in the form of salts selected from the group consisting of sodium and calcium and mixed sodium-calcium salts, and 1,2,3,4,10,10-hexachloro-6,7-epoxy-1,4,4a,5,6,7,8,8a-octahydro-1,4,5,8-dimethanonaphthalene.

10. A pesticidal composition comprising a clay, the solids of the alkaline effluent from the fractional precipitation treatment of waste sulfite liquor in wood pulp manufacture with caustic lime which contain the salts of the modified carbohydrate constituents formed by the hydrolysis of the hemicelluloses in the original wood in the form of salts selected from the group consisting of sodium and calcium and mixed sodium-calcium salts, said salts being in amount from 0.5 to 15 parts per 100 parts of the clay, and 1,2,3,4,10,10-hexachloro-6,7-epoxy-1,4,4a,5,6,7,8,8a-octahydro-1,4,5,8-dimethanonaphthalene in amount from 1 to 150 parts per 100 parts of mineral silicate.

11. A pesticidal composition comprising a powdered mineral silicate, the solids of the alkaline effluent from the fractional precipitation treatment of waste sulfite liquor in wood pulp manufacture with caustic lime which contain the salts of the modified carbohydrate constituents formed by the hydrolysis of the hemicelluloses in the original wood in the form of salts selected from the group consisting of sodium and calcium and mixed sodium-calcium salts, and N-trichloromethylthio tetrahydrophthalimide.

12. A pesticidal composition comprising a clay, the solids of the alkaline effluent from the fractional precipitation treatment of waste sulfite liquor in wood pulp manufacture with caustic lime which contain the salts of the modified carbohydrate constituents formed by the hydrolysis of the hemicelluloses in the original wood in the form of salts selected from the group consisting of sodium and calcium and mixed sodium-calcium salts, said salts being in amount from 0.5 to 15 parts per 100 parts of clay, and N-trichloromethylthio tetrahydrophthalimide in amount from 1 to 150 parts per 100 parts of mineral silicate.

13. A pesticidal composition comprising a powdered mineral silicate, the solids of the alkaline effluent from the fractional precipitation treatment of waste sulfite liquor in wood pulp manufacture with caustic lime which contain the salts of the modified carbohydrate constituents formed by the hydrolysis of the hemicelluloses in the original wood in the form of salts selected from the group consisting of sodium and calcium and mixed sodium-calcium salts, and 1,2,3,4,5,6-hexachlorocyclohexane, gamma isomer.

14. A pesticidal composition comprising a clay, the solids of the alkaline effluent from the fractional precipitation treatment of waste sulfite liquor in wood pulp manufacture with caustic lime which contain the salts of the modified carbohydrate constituents formed by the hydrolysis of the hemicelluloses in the original wood in the form of salts selected from the group consisting of sodium and calcium and mixed sodium-calcium salts, said salts being in amount from 0.5 to 15 parts per 100 parts of the clay, and 1,2,3,4,5,6-hexachlorocyclohexane, gamma isomer in amount from 1 to 150 parts per 100 parts of mineral silicate.

15. A pesticidal composition comprising a powdered mineral silicate, the solids of the alkaline effluent from the fractional precipitation treatment of waste sulfite liquor in wood pulp manufacture with caustic lime which contain the salts of the modified carbohydrate constituents formed by the hydrolysis of the hemicelluloses in the original wood in the form of salts selected from the group consisting of sodium and calcium and mixed sodium-calcium salts, and 1,1,1-trichloro-2,2-bis(p-chlorophenyl)ethane.

16. A pesticidal composition comprising a clay, the solids of the alkaline effluent from the fractional precipitation treatment of waste sulfite liquor in wood pulp manufacture with caustic lime which contain the salts of the modified carbohydrate constituents formed by the hydrolysis of the hemicelluloses in the original wood in the form of salts selected from the group consisting of sodium and calcium and mixed sodium-calcium salts, said salts being in amount from 0.5 to 15 parts per 100 parts of the clay, and 1,1,1-trichloro-2,2-bis(p-chlorophenyl)ethane in amount from 1 to 150 parts per 100 parts of mineral silicate.

References Cited in the file of this patent

UNITED STATES PATENTS

| | | |
|---|---|---|
| 2,140,794 | Epstein | Dec. 20, 1938 |
| 2,219,364 | Horsfall et al. | Oct. 29, 1940 |

FOREIGN PATENTS

| | | |
|---|---|---|
| 613,957 | Great Britain | Dec. 7, 1948 |
| 5920/27 | Australia | Feb. 10, 1928 |

OTHER REFERENCES

Cellulose and Cellulose Derivatives, 1946, by Ott, pp. 427–431.